United States Patent
Leon et al.

(10) Patent No.: US 7,957,763 B2
(45) Date of Patent: Jun. 7, 2011

(54) METHOD AND APPARATUS FOR SELECTING CALL LIST NUMBERS BASED ON ENTRY/EXIT TO A WLAN

(75) Inventors: Manuel J. Leon, Lake Worth, FL (US); Sophia L. Chang Stilwell, Tamarac, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 253 days.

(21) Appl. No.: 11/293,898

(22) Filed: Dec. 5, 2005

(65) Prior Publication Data
US 2007/0127409 A1 Jun. 7, 2007

(51) Int. Cl.
*H04M 1/00* (2006.01)
(52) U.S. Cl. .............. 455/551; 455/550.1; 455/552.1; 455/553.1; 455/554.1
(58) Field of Classification Search .............. 455/426.1, 455/432.1–432.3, 459, 460, 461, 550.1–554.1, 455/445
See application file for complete search history.

(56) References Cited

U.S. PATENT DOCUMENTS

| | | | |
|---|---|---|---|
| 4,751,728 A | 6/1988 | Treat | |
| 4,989,230 A | 1/1991 | Gillig et al. | |
| 5,127,042 A | 6/1992 | Gllig et al. | |
| 5,260,988 A | 11/1993 | Schellinger et al. | |
| 5,265,262 A | 11/1993 | Grube et al. | |
| 5,301,353 A | 4/1994 | Borras et al. | |
| 5,367,558 A | 11/1994 | Gillig et al. | |
| 5,400,395 A | 3/1995 | Berenato | |
| 5,442,680 A | 8/1995 | Schellinger et al. | |
| 5,463,674 A | 10/1995 | Gillig et al. | |
| 5,613,201 A * | 3/1997 | Alford et al. | 455/18 |
| 5,842,122 A | 11/1998 | Schellinger et al. | |
| 5,901,357 A | 5/1999 | D'Avello et al. | |
| 5,983,098 A | 11/1999 | Gerszberg et al. | |
| 6,014,376 A | 1/2000 | Abreu et al. | |
| 6,078,652 A | 6/2000 | Barak | |
| 6,130,892 A | 10/2000 | Short et al. | |
| 6,141,560 A | 10/2000 | Gillig et al. | |
| 6,151,491 A | 11/2000 | Farris et al. | |
| 6,363,246 B1 | 3/2002 | Williams et al. | |
| 6,658,264 B1 * | 12/2003 | Irvin | 455/552.1 |
| 7,174,187 B1 * | 2/2007 | Ngan | 455/552.1 |
| 7,254,781 B1 | 8/2007 | Land et al. | |
| 2004/0170150 A1 | 9/2004 | Guo et al. | |
| 2005/0003822 A1 * | 1/2005 | Aholainen et al. | 455/445 |

(Continued)

OTHER PUBLICATIONS

U.S. Appl. No. 11/247,413, filed Oct. 11, 2005, Smith et al.

(Continued)

*Primary Examiner* — Lester Kincaid
*Assistant Examiner* — Mehmood B Khan

(57) ABSTRACT

A wireless communication device (100) includes a transceiver (204) that is operable to communicate with a first wireless communication network (104) and a second wireless communication network (106). The device (100) also includes a memory (216) for storing at least a first destination-device identifier (304) associated with the first wireless communication network (104) and a second destination-device identifier (306) associated with the second wireless communication network (106). The device (100) further includes a controller (210) coupled to the transceiver (204) and the memory (216), for determining whether the device is within coverage of the first wireless communication network (104) and causing only the first destination-device identifier (304) to be selected from the memory (216) if the device is within coverage of the first wireless communication network (104) and causing only the second destination-device identifier (306) to be selected from the memory (216) if the device is outside the coverage of the first wireless communication network (104).

9 Claims, 4 Drawing Sheets

U.S. PATENT DOCUMENTS

| | | |
|---|---|---|
| 2005/0009504 A1 | 1/2005 | Kyung et al. |
| 2005/0025182 A1* | 2/2005 | Nazari .......................... 370/469 |
| 2005/0039004 A1 | 2/2005 | Adams et al. |
| 2005/0117566 A1 | 6/2005 | Davidson |
| 2005/0190716 A1 | 9/2005 | Buckley et al. |
| 2005/0191997 A1 | 9/2005 | Spearman et al. |
| 2005/0197111 A1 | 9/2005 | Alanara et al. |
| 2005/0233733 A1 | 10/2005 | Roundtree et al. |
| 2007/0082660 A1 | 4/2007 | Smith et al. |
| 2007/0123285 A1 | 5/2007 | Baudino et al. |
| 2007/0135128 A1 | 6/2007 | Villa et al. |
| 2007/0171910 A1* | 7/2007 | Kumar .......................... 370/392 |

OTHER PUBLICATIONS

PCT "Notification of Transmittal of the International Search Report and the Written Opinion of the International Searching Authority, or the Declaration" mailed Oct. 10, 2007, pp. 1-8, PCT/US2006/38600, Alexandria, Virginia.

United States Patent Office, "Office Action Summary", mailed Mar. 25, 2008, pp. 1-11, U.S. Appl. No. 11/304,254, Alexandria Virginia.

United States Patne Office, "Office Action Summary", mailed Jun. 9, 2008, pp. 1-30 , U.S. Appl. No. 11/247,413, Alexandria Virginia.

\* cited by examiner

| NAME | WAN IDENTIFIER 1 | WLAN IDENTIFIER 1 | OTHER |
|---|---|---|---|
| JOHN JONES | (555) 723-1415 | 4231 | (555) 445-5656 |
| MELINDA POOL | (555) 343-8874 | 9749 | (555) 211-8895 |
| STEVEN MERCER | (555) 879-1141 | 2243 | (555) 785-7857 |
| WILLIAM MOTO | (555) 778-8897 | 1140 | (555) 989-5254 |

METHOD AND APPARATUS FOR SELECTING CALL LIST NUMBERS BASED ON ENTRY/EXIT TO A WLAN

BACKGROUND OF THE INVENTION

1. Field of the Invention

This invention relates in general to seamless multi-network wireless service handoffs and more particularly to automatically switching between destination device contact numbers in a call list based on network coverage type.

2. Description of the Related Art

Wireless Local Area Networks (WLANs) are typically supported by WLAN servers, which may alternatively be referred to as private branch exchanges (PBXs) or enterprise servers. The PBX normally provides a control and switching function for the WLAN and communication units operating therein or users thereof. The WLAN can be an attractive and inexpensive alternative for typical voice services such as telephony or dispatch services and may provide additional amenities such as high-speed wireless Internet and Intranet access as well as other real-time applications that may be more specific to a given enterprise.

Wireless Wide Area Networks (wireless WANs or WANs) such as conventional cellular telephone systems are also known. Such networks provide the advantage of wide area coverage but may not be economically attractive for routine access to wideband or high speed data capabilities, such as are required for certain Internet or Intranet applications. Nevertheless a communication unit that is operating on a WLAN may move beyond the effective service area for the WLAN and thus need support or services from a WAN.

Each network type—WLAN and WAN—provide a unique device identifier to each subscribing device to facilitate location of and connection to each of the wireless devices. WAN networks typically provide 10-digit identifiers, while WLANs typically provide 4-digit identifiers, but may also provide a 10-digit WLAN identifier. Connection of wireless devices through a WLAN typically does not implicate any expense to the users. However, if a first user connects to a second user by utilizing the second user's 10-digit WAN identifier, the second user will be connected through the WAN to the first user, even if both users are within a coverage area of a WLAN. Unlike the WLAN, connection through the WAN typically incurs a per-minute charge. Therefore, if a WLAN connection is available, connection of users through a WAN should be automatically avoided.

Currently, a user of an originating device must consciously consider where the originating device is currently located and where destination device might be located before placing a call. These considerations are burdensome on the originating user, waste time, create extra steps in placing a call, and often result in improper guessing by the originating user, necessitating a second attempt.

Therefore a need exists to overcome the problems with the prior art as discussed above.

SUMMARY OF THE INVENTION

Briefly, in accordance with the present invention, disclosed is a wireless communication device with a transceiver that is able to communicate with a Wide Area Network (WAN) and a Wireless Local Area Network (WLAN). The device has a memory for storing a destination-device identifier associated with the WAN and a destination-device identifier associated with the WLAN. The device also has a controller, coupled to the transceiver and the memory, for determining whether the wireless communication device is within coverage of the WLAN, and for causing only the WLAN destination-device identifier to be selected from the memory if the wireless communication device is within coverage of the WLAN and for causing only the second destination-device identifier to be selected from the memory if the wireless communication device is outside the coverage of the WLAN.

In one embodiment of the present invention, the wireless device has a display coupled to the controller, the display for displaying the selected destination device identifier to a user.

In an embodiment of the present invention, the controller is operable to determine whether the wireless communication device is within coverage of the WLAN, and for causing only the WLAN identifier to be selected from the memory if the wireless communication device is within coverage of the WLAN network and causing only the WAN identifier to be selected from the memory if the wireless communication device is outside the coverage of the WLAN.

In one embodiment of the present invention, the WAN is a carrier network and the WAN identifier is a cellular phone number.

In an embodiment of the present invention, the WLAN is a non-carrier network and the WLAN identifier is a WLAN phone number.

The present invention also includes a method for selecting a device identifier from a call list. The method includes the steps of determining a network providing communication service to an originating wireless device; searching a memory coupled to the originating wireless device, the memory containing at least a WLAN identifier associated with a WLAN network and a WAN identifier associated with a WAN network; and selecting only one of the identifiers based on the network providing communication service to the originating wireless device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF THE PREFERRED EMBODIMENT

Figure 1:
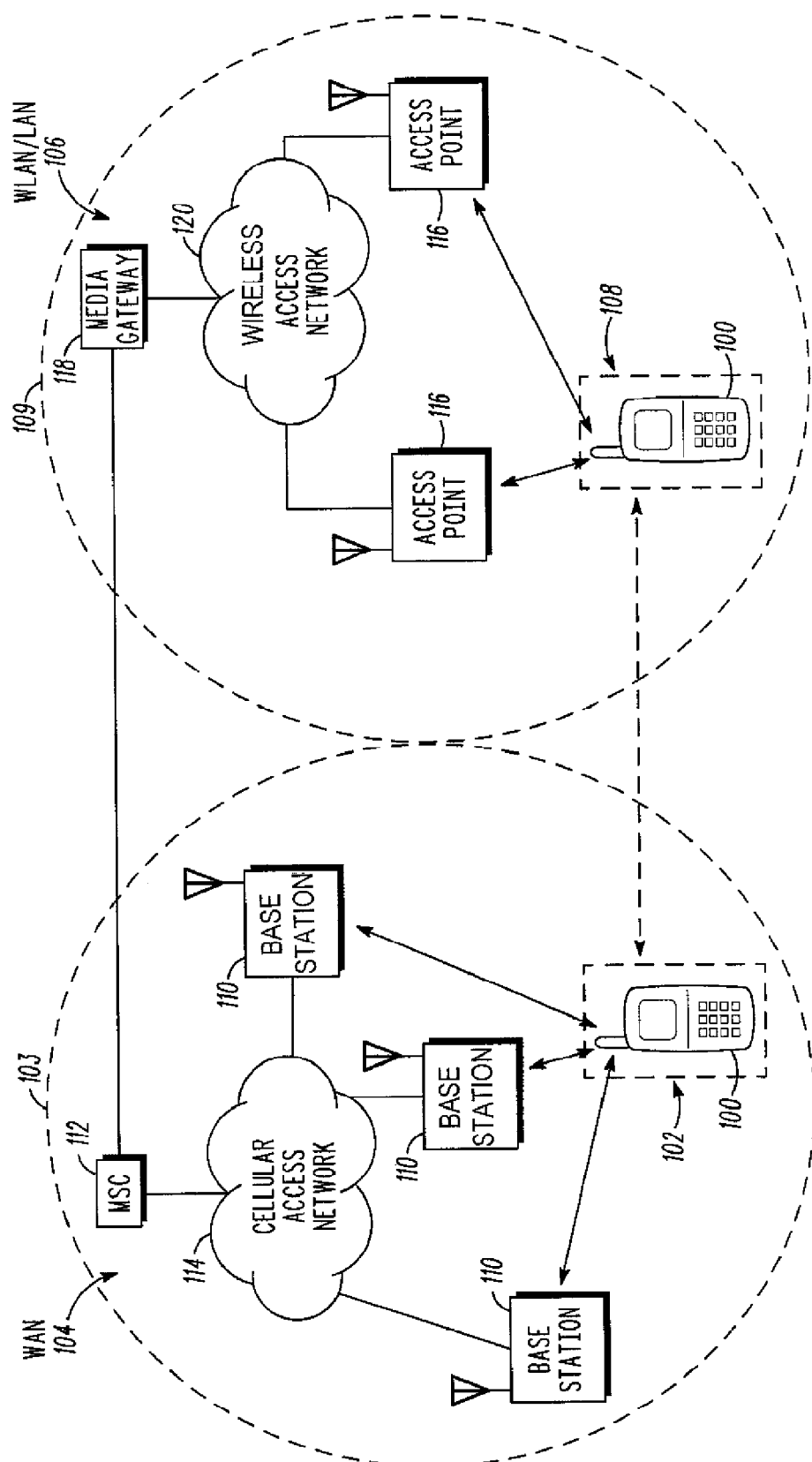
FIG. 1 is an illustrating of a wireless device moving between two networks in accordance with an embodiment of the present invention.

While the specification concludes with claims defining the features of the invention that are regarded as novel, it is believed that the invention will be better understood from a consideration of the following description in conjunction with the drawing figures, in which like reference numerals are carried forward.

The present invention relates to a method and apparatus for implementing automatically alternating groups of wireless-device identifiers in a call list 404 (see FIG. 4) when transitioning coverage between two networks. In particular, the present invention enables a wireless device 100 to automatically detect if it is within the coverage of a WLAN. The wireless device 100 then automatically edits its call list 404 to either display a 4-digit WLAN identifier of other devices in the WLAN service coverage or to automatically place a call using the WLAN identifier, so that the originating user can only call another device by using the WLAN identifier and thereby avoid incurring any service-provider charges. In some WLANs, a 10-digit identifier is assigned to a particular device, or both a 4-digit and a 10-digit identifier are assigned and may be used. In one embodiment of the present invention used in a WLAN with two identifiers, both identifiers are shown to the originating user for selection. In another embodiment, one of the numbers is automatically dialed when the originating user selects the destination user's name from the call list 404.

Alternatively, the present invention removes the WLAN identifiers from the call list 404 if the originating wireless device is out of the coverage of a WLAN. Removing the WLAN identifiers simplifies the call process. Removing the WLAN identifiers from the list of choices eliminates the need for a caller to navigate around the WLAN identifiers to get to the WAN identifier or accidentally selecting the WLAN identifiers. In addition, many cellular subscription plans include free "mobile-to-mobile" or "in-network" calling to subscribers of the same cellular service. By calling the destination device using the 10-digit WAN identifier, the free mobile-to-mobile minutes may be utilized.

The present invention can be utilized for situations in which a wireless device 100 moves between control areas of various networks, such as carrier networks and non-carrier networks. Carrier networks operate on cellular networks or Wide Area Networks (WAN) and, generally, are controlled by cellular carriers including, but not limited to, Cingular Wireless, Sprint PCS, Metro PCS, Verizon Wireless, and Tmobile Wireless. Carrier networks typically employ an analog-based air interface and/or one or more digital-based air interfaces. Digital-based air interfaces utilize digital communication technologies including, but not limited to, Code Division Multiple Access (CDMA), Time Division Multiple Access (TDMA), Global System for Mobile Communications (GSM), Wideband Code Division Multiple Access (WCDMA), Code Division Multiple Access-3rd Generation (CDMA2000), and the like.

Non-carrier networks operate on wireless networks and, generally, are not controlled by cellular carriers. Non-carrier networks employ a wireless local area network (WLAN) based air interface including, but not limited to, IEEE 802.11 supported by the Institute of Electrical and Electronics Engineers, Inc., Wi-Fi supported by the Wireless Ethernet Compatibility Alliance, Bluetooth™ supported by the Bluetooth SIG, Inc., HomeRF supported by the HomeRF Working Group Inc., and the like.

The communication units or devices that operate within these networks have wireless communication capabilities, such as IEEE 802.11, Bluetooth, or Hiper-Lan and the like that preferably utilize CDMA, frequency hopping, OFDM or TDMA access technologies and one or more of various networking protocols, such as TCP/IP (Transmission Control Protocol/Internet Protocol), UDP/IP (User Datagram Protocol/IP), IPX/SPX (Inter-Packet Exchange/Sequential Packet Exchange), Net BIOS (Network Basic Input Output System) or other protocol structures.

The following drawings will be helpful in understanding the present invention. Turning now to FIG. 1, a diagram of one embodiment of the present invention is shown where communication establishment and handover is accomplished between two networks: a WAN and a WLAN. For this illustration, a wireless device 100 at a first position 102 is within a coverage area 103 of and may establish a call using a carrier network (WAN) 104. The device 100 may also move to a second position 108 within radio coverage 109 of a non-carrier network (WLAN) 106 and establish a call on the WLAN 106. However, the wireless device 100 at the second position 108 may establish a call using the WLAN 106 and, thereafter, "handover" the call to the WAN 104 after the wireless device 100 moves to the first position 102 within radio coverage of the WAN 104. The "handover" function provides a relatively invisible transition to the user. Once the device begins to move out of range of the WLAN, a call is placed to the WAN. The device has two calls in process at this time. Once communication via the WAN is fully established, the WLAN call is terminated and the device switches lines without any input from the user. If the user moves back into the coverage of the WLAN, the call will be moved back into the coverage of the WLAN. Typically, the user is unaware of any of these transitions. Of course, although a carrier network and a non-carrier network are represented in FIG. 1, the present invention may also be utilized for communication between two carrier networks and between two non-carrier networks.

Each network includes a plurality of transceivers for communicating with the wireless device 100, an intercommunication component for communicating between networks, and an interoperable arrangement for communicating between the plurality of transceivers and the intercommunication component. As shown in FIG. 1, the carrier network 104 may include a plurality of base stations 110, a Mobile Switching Center ("MSC") 112, and a cellular access network 114 communicating between the base stations and the MSC 112. The non-carrier network 106 may include a plurality of access points 116, a media gateway 118, and a wireless access network 120, that may alternatively be referred to as Private Branch Exchange (PBX), enterprise server, media gateway controller (MGC) and so on. The wireless access network 120 allows communication between the access points 116 and the media gateway 118. The networks 104, 106 communicate with each other via the MSC 112 and the media gateway 118.

As stated above, the present invention enables a wireless device 100 to operate seamlessly between networks without regard to the air interface technology utilized by the wireless device 100 for wireless communications. It is important to understanding the present invention to note that a bearer channel established between stations and/or devices is always established through a media gateway, whether the call is initiated from a carrier network to a non-carrier network, from a non-carrier network to a carrier network, from a non-carrier network to another non-carrier network, or from a carrier network to another carrier network. Also, one or more of the wireless devices 100 engaged in the call are assigned a telephone number associated with each network, for example, one number for a carrier network and another number for a non-carrier network. For the present invention, wireless devices 100 that are assigned multiple numbers will be capable of handover regardless of the call originator and network of call initiation.

It is also important to understand that, because all calls are routed through the media gateway 118, each handover of a mobile wireless device 100 between networks is a "make before break" soft handover, and control of each handover is implemented by the media gateway 118 without intervention or control by the carrier network 104. Thus, SS7 or other control signaling, as utilized by traditional switching systems, is not required to accomplish the goals of the present invention. For example, in reference to FIG. 1, the present invention does not require SS7 or other control signaling to be communicated between the MSC 112 and the media gateway 118.

Stated another way, the media gateway of the present invention does not handover control of a communication with a wireless device 100 to a carrier network. Instead, the media gateway retains control of the communication as the wireless device 100 re-locates from one network to another network. In particular, when a mobile wireless device 100 and a remote wireless device have a call that is directed through the media gateway, the media gateway has one connection to the mobile wireless device 100 and another connection to the remote wireless device. Herein, the connection between the media gateway and the mobile wireless device 100 shall be referred to as a first call leg. The media gateway then establishes a second call leg with the mobile wireless device 100 so that the first and second call legs exist concurrently, hands over the communication from the first call leg to the second call leg, and disconnects the first call leg after handover has been completed. By retaining control of the communication with the mobile wireless device 100, the media gateway is capable of handover without intervention or control by a carrier network. As will be explained in detail below, the wireless devices 100 are cognizant of which wireless network they are and are not connected through (determining that the device is either within coverage or outside of the coverage of a particular wireless network) and, according to one aspect of the present invention, can make configuration adjustments accordingly.

Figures 2, 3:
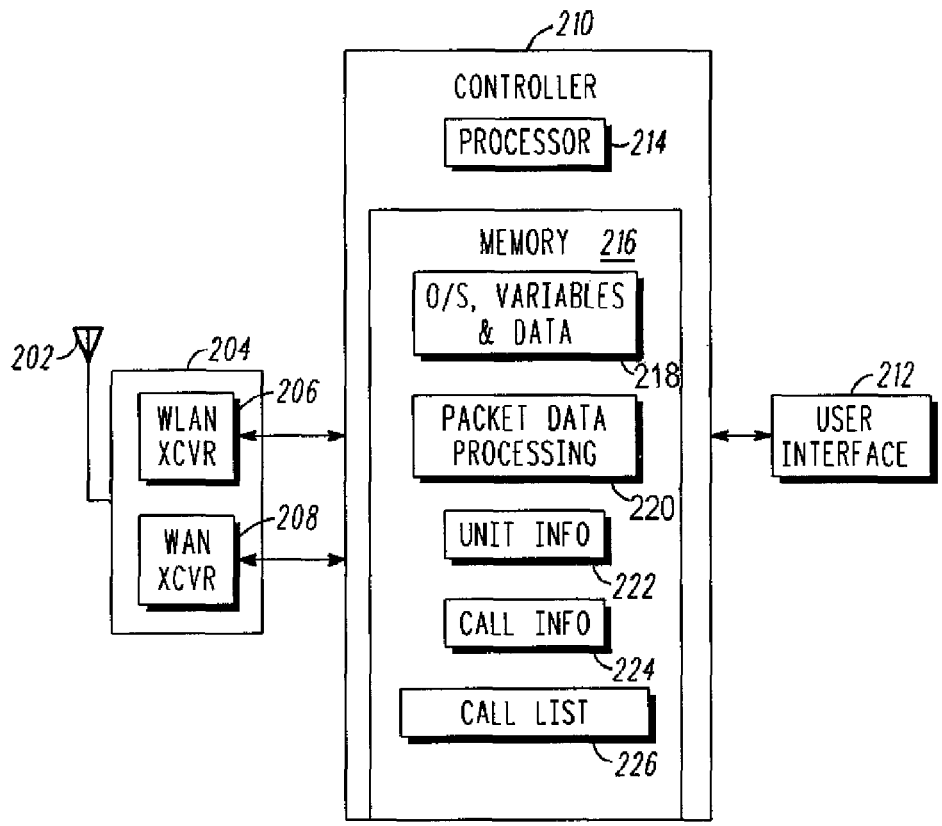
FIG. 2 is a simplified block diagram of a wireless communication device in accordance with an embodiment of the present invention.
FIG. 3 is a table illustrating a portion of the contents of a memory in accordance with an embodiment of the present invention.

Referring now to FIG. 2, a simplified block diagram of a wireless communication unit 100 that is capable of facilitating a handover of an ongoing communication with the wireless communication unit 100 from a first to a second wireless communication network will be discussed and described. The communication unit 100 is generally known, thus the known functions and structure of such devices will not be described in detail other than as related to the inventive principles and concepts disclosed and discussed below. The communication unit 100 includes an antenna 202 or antenna structure that operates to couple radio frequency signals between a transceiver 204 and the first or second network 104, 106. For example, radio signals that are transmitted from the WAN 104 or WLAN 106, such as respectively, by the base stations (WAN transceiver) 110 or the access points (WLAN transceiver) 116 are absorbed by the antenna 202 and coupled to a receiver, that is part of the transceiver 204.

Signals that are amplified by and coupled from the transceiver 204, specifically a transmitter (WLAN transmitter or WAN transmitter), to the antenna 202 are radiated or transmitted or sent to the access point 116 or base 110 station according to known WLAN technologies, such as 802.11 and others earlier mentioned or according to known WAN technologies, such as known cellular networks. The transceiver 204 will be configurable to support simultaneous air interfaces with multiple communication networks according to the conventions and protocols of each or may alternatively further include one or more of a WLAN transceiver 206 and WAN transceiver 208 for such purposes as will be appreciated by those of ordinary skill. The transceiver 204 or respective receivers and transmitters are inter coupled as depicted and interactively operate with and are controlled by a controller 210 to provide to, or accept or receive from, the controller 210, voice traffic or data messages or signals corresponding thereto such as in packet data form.

Accordingly, the transceiver 204, as controlled by, and in cooperation with, the controller 210 and functions thereof, provide the communication unit, or wireless device, 100 with multi or dual operating mode capability. More particularly, the communication unit 100 is capable of registering with and obtaining service from the first (WAN) and the second (WLAN) communication network 104 and 106, respectively. The controller can operate to determine whether the wireless device 100 is within coverage or outside the coverage of a particular wireless network in many different ways, as should be obvious to those of ordinary skill in the art in view of the present discussion. For example, and without limitation, some transceivers 204 use a received signal strength indication (RSSI) signal to indicate whether the wireless device 100 is in coverage of a wireless network. As another example, and without limitation, a signal coding scheme such as used for CDMA type wireless communication systems can be received and decoded by a transceiver 204 to indicate whether the wireless device 100 is in coverage. As a third example, and without limitation, a wireless device 100 may utilize a location detection means to detect the location of the wireless device in a geographic area. A location detection means may include use of a GPS receiver or other signal receiver that indicates location of the wireless device 100 within a geographic area. The location of the wireless device 100 in a geographic area may be used to determine whether the wireless device is within coverage or outside of the coverage of a wireless network. Other equivalent forms of determination of in-network or outside-of-network coverage for the wireless device 100 should be obvious to those of ordinary skill in the art in view of the present discussion.

The controller 210 is coupled to and generally operates in a known manner with a user interface 212. The user interface 212 is known and typically includes, for example, audio transducers, such as an earphone or speaker and microphone, a display, and a keypad. The transceiver and user interface are each inter coupled and the controller 210 provides overall operational command and control for the communication unit 100.

The controller 210 is essentially a general-purpose processor and, preferably, includes a processor 214 and an associated memory 216. The processor 214 is, preferably, a known processor based element with functionality that will depend on the specifics of the air interfaces with the first and the second network as well as various network protocols for voice and data traffic. The processor 214 will operate to encode and decode voice and data messages to provide signals suitable for the transceiver, a transducer, or further processing by the controller 210. The processor 214 may include one or more generally available microprocessors, digital signal processors, and other integrated circuits depending on the responsibilities of the controller 210 with respect to signal processing duties or other unit features that are not relevant here.

In any event, the controller 210 also includes the memory 216 that may be, for example, a combination of known RAM (Random Access Memory), ROM (Read-Only Memory), EEPROM (Electrically Erasable Programmable ROM) or magnetic memory. The memory 216 is used to store among various other items or programs etc., an operating system or software and data 218, such as the call list 404, for execution or use by the processor 214. This operating software 218 when executed by the processor 214 will result in the processor performing the requisite functions of the communication unit 100 such as interfacing with the user interface 212 and transceiver 204 or transmitting and receiving devices.

The memory 216 further includes call processing routines not specifically shown for supporting voice and data calls that will be appreciated by one of ordinary skill and that will vary depending on air interface, call processing, and service provider or network specifics.

Additionally, packet data processes 220 are provided for formulating appropriate packets for transport according to the specifics of the communication networks. Furthermore various data is provided in the memory, specifically unit information 222 including identification information to identify the communication unit 100 and call information 224. Collectively this information can be used to identify a particular unit and a particular call.

A further memory location 226 is used to store device, system, or user specified information. One example of such information is a call list used to facilitate communication to other devices 100 within the network or within other networks to which the originating device is not a member. This information can also be stored in other locations in memory 216 or other memories that are a part of the wireless device 100 or are external to the wireless device 100.

Referring now to FIG. 3, a portion of memory location 226 is shown in tabular organization, although the memory does not necessarily have any required organizational structural format. The memory location 226 includes a name field 302, a first WAN identifier 304, such as a cellular telephone number, a WLAN identifier 306, and an optional extra field or fields 308 for storing alternate contact numbers, such as a public switched telephone number, a fax number, or others. The memory location 226 can include many other fields and values and can be used to store all information pertaining to a remote user and/or that user's communication device.

Figure 4:
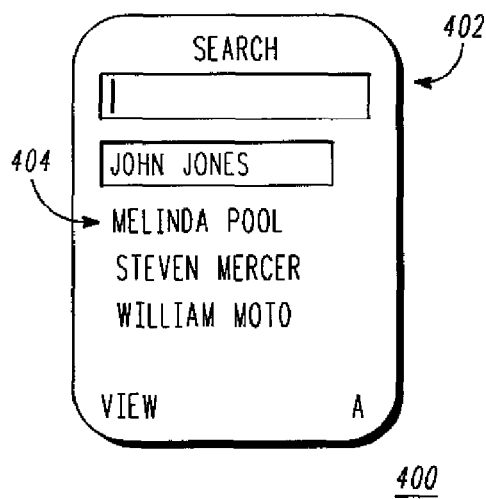
FIG. 4 is a diagram illustrating a wireless device display screen showing names in a call list in accordance with an embodiment of the present invention.
Figure 5:
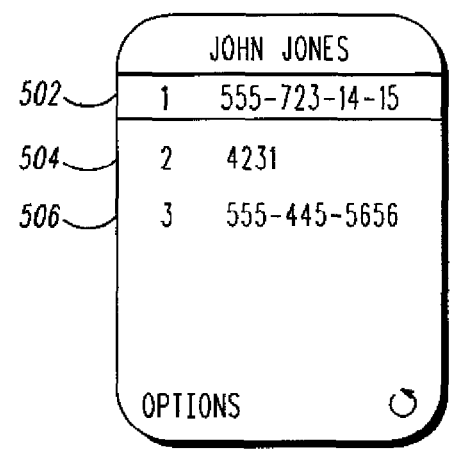
FIG. 5 is a diagram illustrating a wireless device display screen showing an entry in a call list with numbers associated with multiple networks in accordance with an embodiment of the present invention.

FIG. 4 is an illustration of one embodiment of a display 400, as is included in the user interface 212. The display 400 is used to allow a user of a wireless device 100 to interact with portions of the software and hardware comprising the device. One such use of the display is to select destination devices to which a communication link is desired. The wireless devices 100 are generally identified by the name of their user, although this is not always the case. The display in FIG. 4 shows a search screen 402 where the call list 404 of names is displayed. A name can be selected by typing the characters via a keypad or by scrolling down to the proper name and pressing a button to select the name. Traditionally, once a name is selected, the display 400 changes to a further screen, such as that shown in FIG. 5, where a list of available contact numbers is displayed. FIG. 5 shows three available numbers for John Jones. The first entry 502 is a typical 10-digit WAN identifier that can be used to connect to a second user via a carrier network. The second entry 504 is a WLAN 4-digit identifier that can be used to connect to the second user through an enterprise server or others, as previously described. The third entry 506 shown in FIG. 5 is an exemplary third contact number that may include a telephone number of a non-cellular communication device, such as a wired telephone.

In one embodiment of the present invention, the wireless device 100, through logic residing in memory 216 considers the network in which the originating wireless device resides at the time a call is initiated. The originating wireless device 100 then makes configuration adjustments accordingly. Specifically, if the originating wireless device 100 is within the coverage of a WLAN, it would be highly advantageous to be connected through the WLAN to the destination device to take advantage of the increased bandwidth of the WLAN and avoid the usage costs of the WAN. Therefore, in one embodiment of the present invention, the destination user's WAN identifier, such as the first entry 502, is not displayed on the originating device's display when the call is being initiated. As a result, the originating caller will automatically be linked to the recipient through the WLAN identifier without any further input by the user. If the destination device is also under the coverage of the WLAN, the call will be free to the users. If the destination device is not under (is outside) the coverage of the WLAN, the WLAN will automatically forward the call to the destination device using the destination device's WAN identifier.

Figure 6:
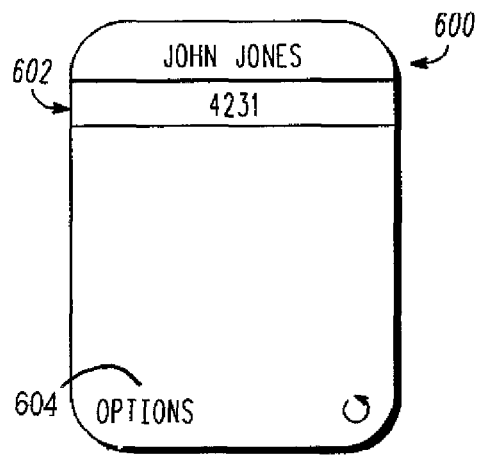
FIG. 6 is a diagram illustrating a wireless device display screen showing an entry in a call list with a number associated with a WLAN network in accordance with an embodiment of the present invention.

In one embodiment, once a name is selected, as shown in FIG. 4, a call is immediately initiated through the either WLAN or WAN, depending on the location of the originating device 100, without any further input from the call-initiating user. In other embodiments, a screen is shown that displays only the entry associated with the network currently available to the originating device 100, such as shown in FIG. 6. In FIG. 6, display screen 600 displays the WLAN identifier 602, which is selectable by the call-initiating user to initiate a call. This embodiment requires an additional step from the call-initiating user; however, other stored information can still be obtained, such as for example, through an options soft button 604 on the display 600. In this embodiment, the call-initiating user can override the automatic number selection and initiate a call through the WAN or any other number instead.

Figure 7:
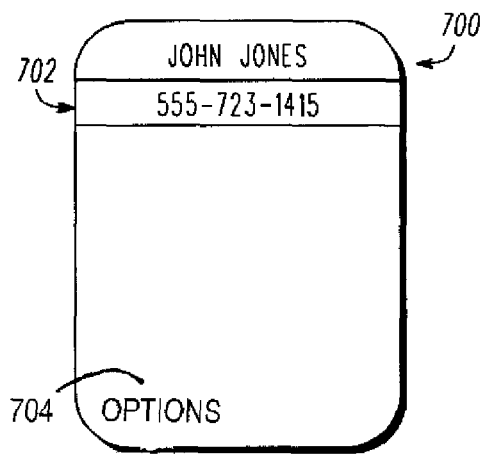
FIG. 7 is a diagram illustrating a wireless device display screen showing an entry in a call list with a number associated with a WAN network in accordance with an embodiment of the present invention.

If the originating device 100 is in the coverage of a WAN only, it is advantageous not to display a destination device's WLAN identifier, or identification number. In this case, the originating device 100 automatically hides the destination device's WLAN identifier from the call-initiating user. As in the example given above, once the destination user name is selected, the call can be immediately initiated without further user input. Alternatively, as shown in FIG. 7, the destination device's 10-digit WAN identifier 702 can be displayed on the screen 700. This embodiment requires an additional step from the call-initiating user; however, other stored information can still be obtained, such as for example, through an options soft button 704 on the display 700. During a handover stage, where the device is receiving coverage of both networks, the device can, in one embodiment of the present invention, display and make available both the WLAN identifier and the WAN identifier to a user. In another embodiment, if the originating device 100 is receiving coverage by the WLAN, a call will always be placed through the WLAN.

Figure 8:
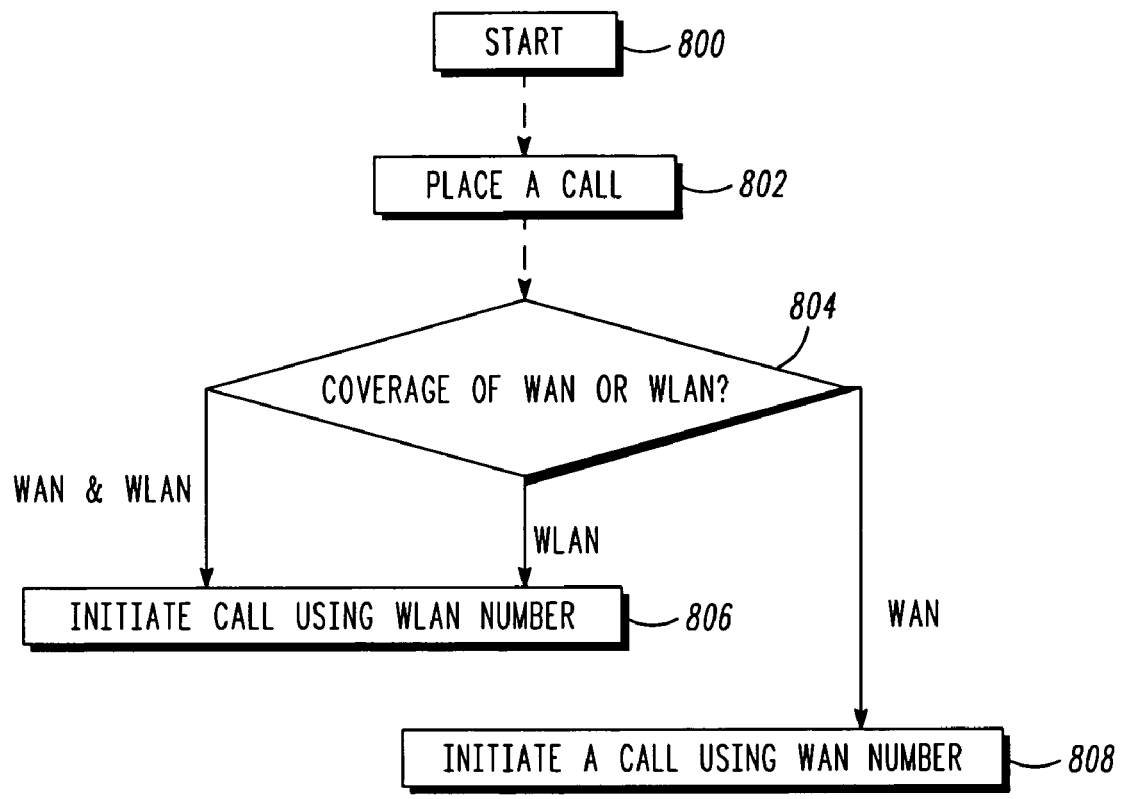
FIG. 8 is a flow diagram illustrating the process of calling a destination wireless device with an origination wireless device in accordance with an embodiment of the present invention.

FIG. 8 shows a flow diagram illustrating a preferred operation of the wireless device 100. The process begins at step 800 and moves directly to step 802 where a user uses the originating device 100 and selects a destination device to place a call. The originating wireless device, in step 804, determines whether it is within coverage of a WLAN or a WAN only. If the device is within coverage of a WLAN, the flow moves to step 806, where the originating device immediately initiates a call to the destination device using the destination device's WLAN identifier. If, in step 804, it is determined that the originating device is within coverage of a WAN only, the device immediately initiates a call, in step 808, to the destination device using the destination device's WAN identifier. It should be noted that in step 804, if it is determined that the originating device is within coverage of both a WLAN and WAN simultaneously, the originating device immediately initiates a call to the destination device using the destination device's WLAN identifier. If the destination device is not within (is outside) the coverage of the WLAN, the WLAN will forward the call to the WAN to connect the devices.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A wireless communication device comprising:
    a transceiver operable to communicate with a wireless carrier network and a wireless non-carrier network;
    a memory for storing at least a cellular phone number associated with the wireless carrier network and a WLAN phone number associated with the wireless non-carrier network, the cellular phone number and the WLAN phone number both being associated with calling one destination device;
    a controller, coupled to the transceiver and the memory, for determining whether the wireless communication device is within coverage of the wireless non-carrier network, and for causing only the WLAN phone number to be selected from the memory to call the destination device if the wireless communication device is within coverage of the wireless non-carrier network and for causing only the cellular phone number to be selected from the memory to call the destination wireless device if the wireless communication device is outside the coverage of the wireless non-carrier network; and
    a display coupled to the controller, the display for displaying one or more contact numbers in a contacts list with at least one of the WLAN phone number and the cellular phone number to a user, the displaying of said one or more contact numbers in a contacts list updated by the controller to display the one of the WLAN phone number and the cellular phone number, while at the same time not displaying the other phone number thereby preventing the user initiating a call to the destination device using the other phone number, when a call is being initiated by the user and the controller has determined a present coverage status of the wireless non-carrier network with respect to the wireless communication device.

2. The wireless communication device of claim 1, wherein when a call is being initiated by the user and the controller has determined that the wireless communication device is within coverage of the wireless non-carrier network, the display is updated by the controller to display the WLAN phone number, and not display the cellular phone number at the same time.

3. The wireless communication device of claim 1, wherein when a call is being initiated by the user and the controller has determined that the wireless communication device is outside of coverage of the wireless non-carrier network, the display is updated by the controller to display the cellular phone number, and not display the WLAN phone number at the same time.

4. The wireless communication device of claim 1, further including a user input device for receiving input from the user, and wherein the controller updates the display to display the selected one of the WLAN phone number and the cellular phone number in response to the user having selected, by entering user input at the wireless communication device, the destination device for initiating a call thereto.

5. The wireless communication device of claim 4, wherein the user input device comprises at least one of a keypad and a button, and the user selects the destination device for initiating a call thereto by at least one of typing characters via the keypad and pressing the button, and in response to the user at least one of typing characters via the keypad and pressing the button to select the destination device for initiating a call thereto the controller updating the display to display the selected one of the WLAN phone number and the cellular phone number, while at the same time not displaying the other of the selected one, the displayed one of the WLAN phone number and the cellular phone number being selectable by the user to initiate a call with the destination device.

6. A method for displaying a phone number, the method comprising:
    determining, with an originating wireless device, a wireless network currently available to provide communication service to the originating wireless device;
    accepting an input from a user of the originating wireless device selecting one of a plurality of destination devices to initiate a call thereto;
    searching a memory coupled to the originating wireless device, the memory containing at least a cellular phone number of the selected one destination device associated with a wireless carrier network and a WLAN phone number of the selected one destination device associated with a wireless non-carrier network;
    selecting, by the originating wireless device, only one of the cellular phone number and the WLAN phone number, based on the wireless network currently available to provide communication service to the originating wireless device being at least one of a wireless carrier network and a wireless non-carrier network;
    displaying one or more contact numbers in a contacts list with the selected one of the cellular phone number and the WLAN phone number to the user to initiate a call to the selected one destination device; and
    preventing placing a call to the selected one destination device using the other phone number of the selected one of the cellular phone number and the WLAN phone number, by at the same time as displaying the one or more contact numbers in a contacts list with the selected one phone number also not displaying the other phone number.

7. The method according to claim 6, further comprising:
    after preventing, placing a call to the selected one destination device using the selected one of the cellular phone number and the WLAN phone number.

8. A computer program product for selecting a phone number, the computer program product comprising:
    a storage medium readable by a processing circuit and storing instructions for execution by the processing circuit for performing a method comprising:
        determining, with an originating wireless device, a wireless network currently available to provide communication service to the originating wireless device;

accepting an input from a user selecting one of a plurality of destination devices to initiate a call thereto;

searching a memory coupled to the originating wireless device, the memory containing at least a cellular phone number of the selected one destination device associated with a wireless carrier network and a WLAN phone number of the selected one destination device associated with a non-carrier network;

selecting, by the originating wireless device, only one of the cellular phone number and the WLAN phone number, based on the network currently available to provide communication service to the originating wireless device being at least one of a wireless carrier network and a wireless non-carrier network;

displaying one or more contact numbers in a contacts list with the selected one of the cellular phone number and the WLAN phone number to the user to initiate a call to the selected one destination device; and preventing placing a call to the selected one destination device using the other phone number of the selected one of the cellular phone number and the WLAN phone number, by at the same time as displaying the one or more contact numbers in a contacts list with the selected one phone number also not displaying the other phone number.

9. The computer program product according to claim 8, further comprising:

after preventing, placing a call to the selected one destination device using the selected one of the cellular phone number and the WLAN phone number.

* * * * *